US008578606B2

(12) United States Patent
Lee

(10) Patent No.: US 8,578,606 B2
(45) Date of Patent: Nov. 12, 2013

(54) MANUFACTURING METHOD OF HEAT PIPE TYPE HEAT-DISSIPATING DEVICE

(75) Inventor: Sang-Cheol Lee, Gyeonggi-do (KR)

(73) Assignee: Icepipe Corporation, Seoul (KR)

( * ) Notice: Subject to any disclaimer, the term of this patent is extended or adjusted under 35 U.S.C. 154(b) by 0 days.

(21) Appl. No.: 13/452,025

(22) Filed: Apr. 20, 2012

(65) Prior Publication Data

US 2012/0198695 A1 Aug. 9, 2012

Related U.S. Application Data

(63) Continuation of application No. PCT/KR2010/006766, filed on Oct. 5, 2010.

(30) Foreign Application Priority Data

Oct. 21, 2009 (KR) ........................ 10-2009-0100258

(51) Int. Cl.
*B23P 6/00* (2006.01)

(52) U.S. Cl.
USPC ........ 29/890.032; 29/33 T; 29/726; 29/726.5; 29/272; 29/890.053; 29/890.03; 29/890.044; 29/890.047; 165/176

(58) Field of Classification Search
USPC ...... 29/33 T, 33 G, 726, 726.5, 272, 890.053, 29/890.03, 890.044, 890.046, 890.047; 165/140, 150, 132, 160, 110, 176
See application file for complete search history.

(56) References Cited

U.S. PATENT DOCUMENTS

| | | | | |
|---|---|---|---|---|
| 4,085,488 | A * | 4/1978 | Hanert et al. | 29/33 G |
| 5,704,123 | A * | 1/1998 | Paulman et al. | 29/890.053 |
| 7,403,392 | B2 | 7/2008 | Attlesey et al. | |

FOREIGN PATENT DOCUMENTS

| | | | |
|---|---|---|---|
| JP | 037889 | A | 1/1991 |
| JP | 03263591 | A | 11/1991 |
| JP | 0423456 | A | 1/1992 |
| JP | 4003781 | | 1/1992 |
| JP | 2001082887 | | 3/2001 |
| JP | 2001284511 | | 10/2001 |
| JP | 2001341337 | | 12/2001 |
| JP | 2005204422 | A | 7/2005 |
| JP | 2009018069 | | 1/2009 |
| JP | 2009018070 | | 1/2009 |
| KR | 20010068100 | | 7/2001 |
| KR | 20090035845 | | 4/2009 |

OTHER PUBLICATIONS

New Zealand First Examination Report dated Jan. 10, 2013, received in corresponding New Zealand Patent Application No. 599715, 2 pgs.
PCT International Search Report dated Jun. 15, 2011, received in corresponding PCT Patent Application No. PCT/KR10/06766, 4 pgs.
PCT Written Opinion dated Jun. 15, 2011, received in corresponding PCT Patent Application No. PCT/KR10/06766, 2 pgs.

(Continued)

*Primary Examiner* — Richard Chang
(74) *Attorney, Agent, or Firm* — Grossman Tucker Perreault & Pfleger, PLLC

(57) ABSTRACT

There is disclosed a manufacturing method of a heat pipe type heat-dissipating device. The method includes the steps of: winding a pipe on a loop forming mold in a spiral shape to form a pipe loop; and pressing at least a section of an outer circumference of the pipe loop so that the pipe loop is plastically deformed in a shape corresponding to the shape of the loop forming mold.

12 Claims, 9 Drawing Sheets

(56) References Cited

OTHER PUBLICATIONS

Taiwan Office Action/Examination Notice dated May 16, 2013, received in corresponding Taiwan Application No. 099133616, with English language translation attached, 5 pgs.

Japanese Office Action dated Jul. 30, 2013, received in corresponding Japanese Application No. 2012-532025, with English language translation attached, 4 pgs.

Australian Office Action dated Sep. 4, 2013, received in corresponding Australian Application No. 2010308793, 3 pgs.

* cited by examiner

MANUFACTURING METHOD OF HEAT PIPE TYPE HEAT-DISSIPATING DEVICE

BACKGROUND OF THE INVENTION

1. Field of the Invention

The present invention relates to a manufacturing method of a heat pipe type heat-dissipating device, and more particularly, to a manufacturing method of a heat pipe type heat-dissipating device which is capable of forming a spiral pipe loop for the heat pipe type heat-dissipating device into a specific shape.

2. Description of the Related Art

In general, an electronic component such as an LED (Light Emitting Diode), a CPU of a computer, a chipset of a video card, a power transistor or the like generates heat during operation. When overheated, the electronic component may malfunction or may be damaged, which requires a heat-dissipating device for preventing the overheating.

As an example of such a heat-dissipating device, there is known a heat pipe type heat-dissipating device. This heat pipe type heat-dissipating device uses a heat transfer mechanism which transfers a large amount of heat in the form of latent heat through expansion and contraction of the volumes of bubbles and a working fluid inside a pipe, thereby assuming a high efficiency of heat dissipation.

In this respect, Korea Patent Registration No. 10-0895694 issued to the present applicant discloses a heat pipe type heat-dissipating device using a fluid dynamic pressure (FDP) and having a pipe loop with a plurality of micro pipe windings.

A process of forming such a pipe loop involves a plastic deformation process of the pipe loop. However, even after the plastic deformation process, part of the pipe loop may not undergo sufficient plastic deformation and may be elastically restored and distorted, thereby making it difficult to form the pipe loop into a desired shape.

Further, it is difficult to arrange the spiral pipe loop in a radial shape and form it into a cylindrical shape, which requires a lot of time and efforts.

SUMMARY OF THE INVENTION

Accordingly, it is desirable to provide a manufacturing method of a heat pipe type heat-dissipating device which is capable of preventing a pipe loop from being elastically restored to form the pipe loop into a desired shape.

Further, it is desirable to provide a manufacturing method of a heat pipe type heat-dissipating device which is capable of arranging a spiral pipe loop in a radial shape to easily form it into a cylindrical shape.

According to an embodiment of the present invention, there is provided a manufacturing method of a heat pipe type heat-dissipating device, including the steps of: winding a pipe on a loop forming mold in a spiral shape to form a pipe loop; and pressing at least a section of an outer circumference of the pipe loop so that the pipe loop is plastically deformed in a shape corresponding to the shape of the loop forming mold.

The method may further include the step of attaching a heat absorbing plate to the pipe loop after the pressing step.

The outer circumference of the loop forming mold may have a polygonal shape, and the pressing step may include the step of pressing side regions between corner regions of the pipe loop so that an inner circumference of the pipe loop is plastically deformed into a shape corresponding to edges of the loop forming mold.

The loop forming mold may include a press groove which has a shape corresponding to the shape of a press member used for pressing the pipe loop in the pressing step and is extended adjacent to the edges of the loop forming mold.

The method may further include the step of arranging the pipe loop inside a first arrangement jig having an inner circumference in a radial shape to form the pipe loop in a cylindrical shape, and the heat absorbing plate attaching step may include the step of attaching the heat absorbing plate to at least one end section of the pipe loop which is formed in the cylindrical shape.

The first arrangement jig may include at least one of a supporting jig which supports an outer circumference of the pipe loop arranged in the radial shape and a spacing jig which maintains respective pipe windings of the pipe loop arranged in the radial shape at a predetermined interval.

The cylindrical pipe loop forming step may include the step of supporting the inner circumference of the pipe loop arranged in the radial shape, using a second arrangement jig of a pillar shape.

The heat absorbing plate attaching step may include the step of attaching the heat absorbing plate to at least one surface of the pipe loop.

The method may further include the steps of introducing a working fluid into the pipe loop and sealing the pipe loop.

The sealing step may include the step of forming a single closed loop by connecting opposite open end sections of the pipe loop.

The pipe loop may include metal such as copper, aluminum or iron.

According to the embodiments of the present invention, it is possible to plastically deform the pipe loop into the shape corresponding to the shape of the loop forming mold through the pressing step, thereby maintaining the pipe loop in a desired shape even after the pipe loop is separated from the loop forming mold.

Further, it is possible to arrange the spiral pipe loop in the radial shape to easily form the cylindrical pipe loop. Thus, it is possible to reduce the manufacturing time and cost.

DESCRIPTION OF THE PREFERRED EMBODIMENTS

Hereinafter, exemplary embodiments for carrying out the present invention will be described with reference to the accompanying drawings.

Figure 1:
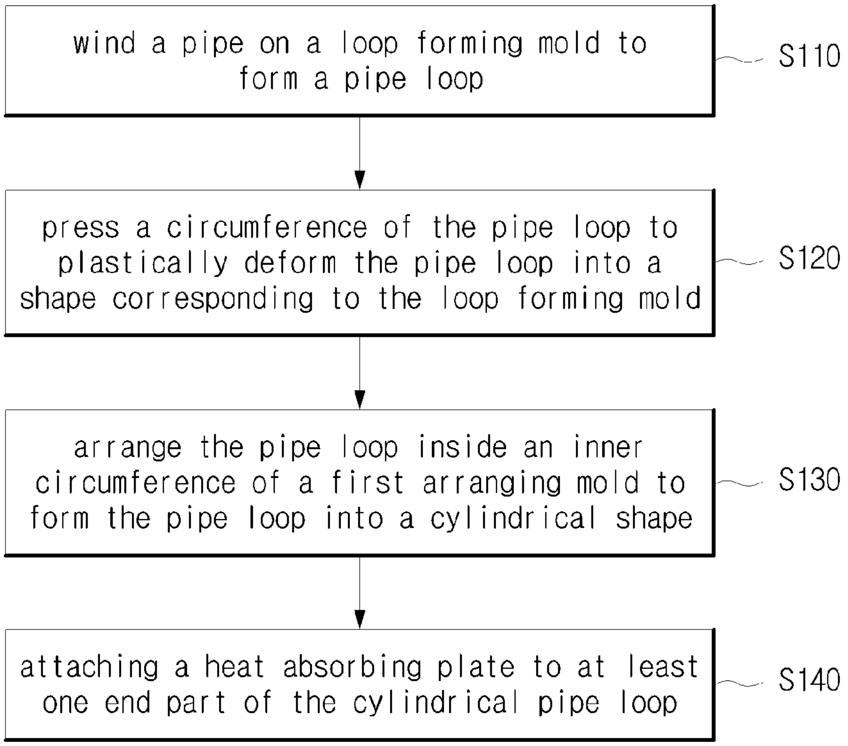
FIG. 1 is a flowchart illustrating a manufacturing method of a heat pipe type heat-dissipating device according to an exemplary embodiment of the present invention.

FIG. 1 is a flowchart illustrating a manufacturing method of a heat pipe type heat-dissipating device according to an exemplary embodiment of the present invention; and FIGS. 2 to 7 are diagrams illustrating a manufacturing method of a heat pipe type heat-dissipating device according to an exemplary embodiment of the present invention.

Referring to FIG. 1, the manufacturing method of the heat pipe type heat-dissipating device according to the exemplary embodiment includes a pipe loop forming step S110 and a pressing step S120, so as to form a pipe loop 10. The method may further include a heat absorbing plate attaching step S140, so as to maintain the pipe loop 10 in a desired shape.

In the pipe loop forming step S110, a pipe 11 is wound on a loop forming mold 1, so as to form the pipe loop 10.

Figure 3:
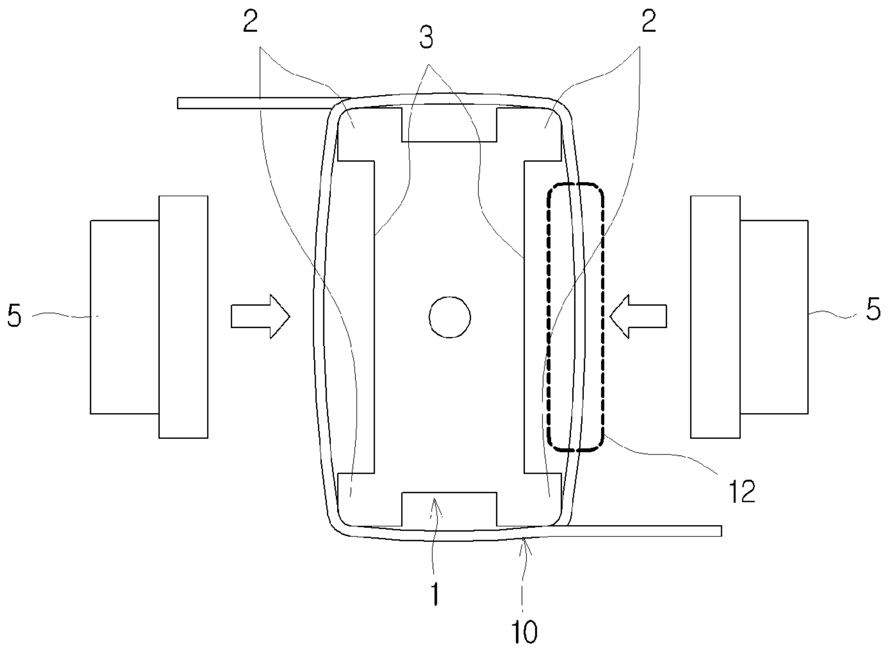

To this end, as shown in FIG. 3, the loop forming mold 1 having a predetermined shape and a micro pipe are prepared in advance. Then, the pipe is wound on the loop forming mold 1 in a spiral shape to thereby form the spiral pipe loop 10 having a plurality of pipe windings.

Specifically, as a rotary shaft 1*a* coupled with the loop forming mold 1 is rotated, the pipe can be wound on the loop forming mold 1 in the spiral shape. Alternatively, after the loop forming mold 1 is fixedly installed, the pipe can be wound on the loop forming mold 1 using a winding device (not shown) to form the spiral pipe loop 10. In this way, the pipe can be wound on the loop forming mold 1 at high speed, to thereby form the spiral pipe loop 10 at high speed.

The spiral pipe loop 10 formed by being wound on the loop forming mold 1 has an inner shape corresponding to the outer shape of the loop forming mold 1. Accordingly, the pipe loop 10 has a different inner shape in dependence upon the outer shape of the loop forming mold 1. For example, the loop forming mold 1 has a polygonal outer shape, the pipe loop 10 has also a polygonal inner shape.

Figure 2:
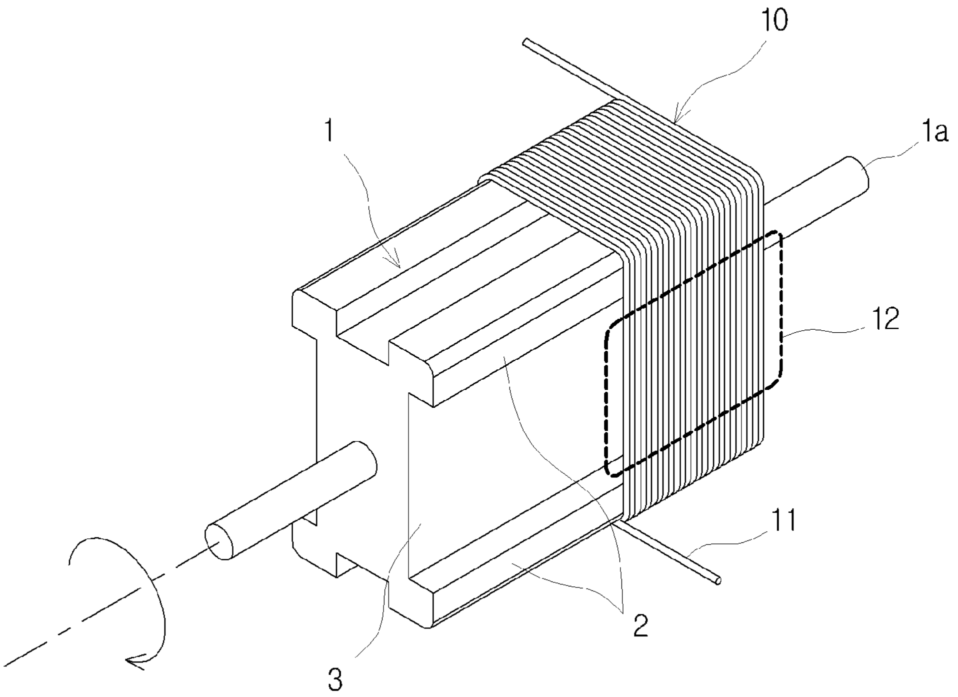
FIGS. 2 to 7 are diagrams illustrating a manufacturing method of a heat pipe type heat-dissipating device according to an exemplary embodiment of the present invention.

In particular, as shown in FIG. 2, in a case where the loop forming mold 1 has a plurality of protruded edges 2, the pipe loop 10 has an inner shape corresponding to a shape formed by connecting the plurality of protruded edges 2 of the loop forming mold 1. For example, if the loop forming mold 1 has a rectangular parallelepiped shape with four side surfaces each having a press groove 3, the pipe loop 10 has a rectangular inner shape. In this case, the press grooves 3 between the adjacent edges 2 does not affect the inner shape of the pipe loop 10 wound on the loop forming mold 1. In this way, the pipe loop 10 can have a variety of inner shapes.

In this specification, the term "polygonal" has a meaning including a variety of shapes except "circular" and "elliptical", in addition to a meaning on a dictionary.

On the other hand, the pipe loop 10 may include a metal material having a high thermal conductivity such as copper, aluminum or iron, so as to receive heat generated from a heat emitting source (see FIG. 7) and give rise to a rapid change in the volume of bubbles mixed in a working fluid.

In the pressing step S120, at least a part of an outer circumference of the pipe loop 10 is pressed so that the pipe loop 10 can plastically deformed into a shape corresponding to the loop forming mold 1.

As shown in FIG. 3, the pipe loop 10 wound on the loop forming mold 1 maintains an elastic deformation at a part thereof. Specifically, corner regions are not sufficiently plastically deformed into the shape corresponding to the edges 2 of the loop forming mold 1, thereby maintaining an elastic deformation. For this reason, right after the wound pipe loop 10 is separated from the loop forming mold 1, the elastically deformed regions tends to restore their original shapes, thereby distorting the shape of the pipe loop 10.

In order to prevent this problem, in the pressing step S120 according to the present embodiment, side regions 12 between the corner regions of the pipe loop 10 are pressed from the outer circumference thereof, so as to plastically deform the corner regions of the pipe loop 10 into the shape corresponding to the edges 2 of the loop forming mold 1.

Specifically, the side regions between the corner regions of the pipe loop 10, which are swollen outward due to the elastic deformation, are pressed by a press member 5 to plastically deform the pipe loop 10 so that the corner regions of the pipe loop 10 comes in close contact with the edges 2 of the loop forming mold 1. In this case, a trace of the plastic deformation such as a minute groove, flattened surface or the like may remain in the pressed regions.

In the above embodiment, the side regions 12 between the corner regions of the pipe loop 10 are pressed from the outer circumference, but the present invention is not limited thereto. For example, other regions such as corner regions of the pipe loop 10 may be pressed so as to plastically deform the pipe loop 10 into the shape corresponding to the loop forming mold 1.

In this respect, in order to prevent a damage of the pipe loop 10 due to the pressing of the press member 5, the press grooves 3 may be formed in the loop forming mold 1 to correspond to the regions pressed by the press member 5. Further, the press grooves 3 may be formed corresponding to the shape of the press member 5. In particular, in the present embodiment, the press grooves 3 may be extended adjacent to the edges 2, so as to bring the corner regions of the pipe loop 10 in close contact with the edges 2 of the loop forming mold 1.

Figure 4:
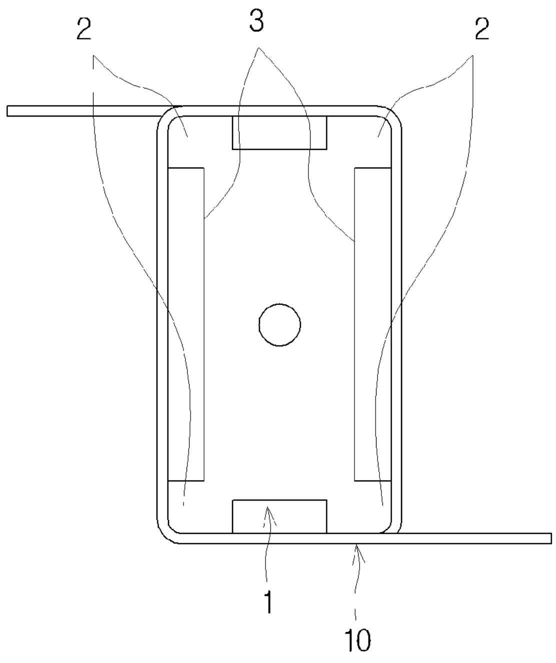

Through the pressing step S120, as shown in FIG. 4, the pipe loop 10 wound on the loop forming mold 1 is plastically deformed into the shape corresponding to the loop forming mold 1. Accordingly, the pipe loop 10 can maintain the plastically deformed shape even after separation from the loop forming mold 1.

In the pressing step S120 according to the present embodiment, the process of pressing opposite two side regions of the pipe loop 10 wound on the loop forming mold 1 is repeated to thereby press four side regions of the pipe loop 10, but the present invention is not limited thereto. For example, the four side regions of the pipe loop 10 may be pressed at the same time. In some cases, only two side regions of the pipe loop 10 may be pressed to plastically deform the corner regions. Further, the pipe loop 10 may be pressed into a variety of shapes according to a variety of shapes of the loop forming mold 1 as long as the pipe loop 10 can be plastically deformed while being in close contact with the loop forming mold 1.

Hereinbefore, the process of forming the pipe loop 10 into a desired shape using the loop forming mold 1 has been mainly described. Now, the process of arranging and maintaining the formed pipe loop 10 into a desired arrangement will be mainly described.

The manufacturing method of the heat pipe type heat-dissipating device may include the heat absorbing plate attaching step S140 so as to maintain the formed pipe loop 10 into a desired shape.

In this respect, the method may further include a cylinder forming step S130 of arranging the pipe loop 10 in a radial form which is advantageous in heat dissipation before the heat absorbing plate attaching step 140.

Figure 5:
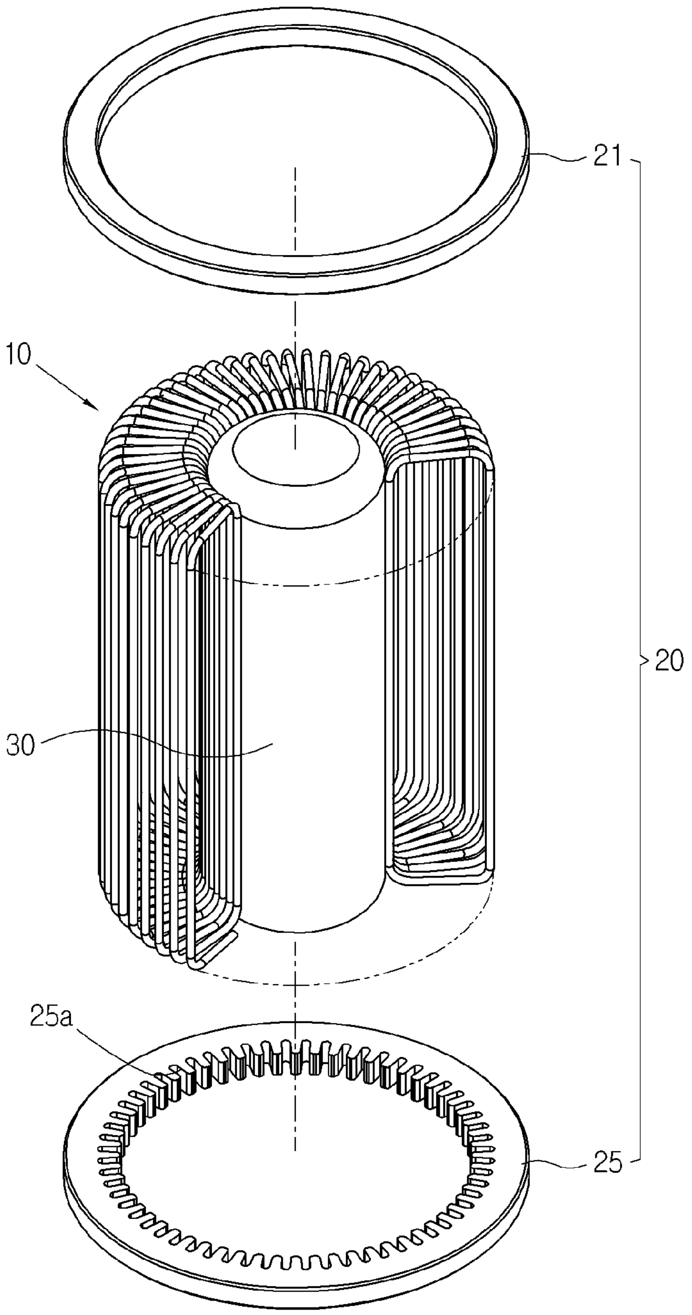

In the cylinder forming step S130, as shown in FIG. 5, the formed pipe loop 10 removed from the loop forming mold 1 is arranged in a radial shape inside the inner circumference of a first arrangement jig 20, so that the pipe loop 10 is arranged in a cylindrical shape. The inner circumference of the first arrangement jig 20 is preferably of a circular shape, but not limited thereto. For example, the inner circumference of the first arrangement jig 20 may be of an elliptical shape or a polygonal shape.

The first arrangement jig 20 may include a supporting jig 21 and a spacing jig 25. In FIG. 5, one supporting jig 21 and one spacing jig 25 are shown, but at least one of the supporting jig 21 and the spacing jig 25 may be provided in a plural number. Further, in FIG. 5, the supporting jig 21 and the spacing jig 25 are provided separately, but may be provided integrally. In addition, one of the supporting jig 21 and the spacing jig 25 may be omitted as necessary.

Specifically, the supporting jig 21 has an annular or cylindrical shape and supports an upper section (in FIG. 5) of the outer circumference of the pipe loop 10 which is arranged in a cylindrical shape, so that the pipe loop 10 can maintain the cylindrical or radial shape.

The spacing jig 25 has an annular or cylindrical shape and supports a lower end section (in FIG. 5) of the pipe loop 10 so that the respective pipe windings of the pipe loop 10 can be arranged at a predetermined interval, for example, at the same interval. To this end, as shown in FIG. 5, a plurality of coupling grooves 25*a* is formed in the inner circumference of the spacing jig 25 at a predetermined interval. In FIG. 5, the spacing jig 25 is disposed at the lower end section (in FIG. 5) of the pipe loop 10, but may be disposed on the outer circumference of the pipe loop 10. In this way, the plurality of pipe windings of the pipe loop 10 is inserted into the coupling grooves 25*a* to thereby maintain the predetermined interval.

On the other hand, when the pipe loop 10 is arranged in the radial shape by the first arrangement jig 20, the inner circumference of the pipe loop 10 may be supported by a second arrangement jig 30 having a pillar shape. Thus, the inner and outer circumference of the pipe loop 10 can be simultaneously supported by the first arrangement jig 20 and the second arrangement jig 30, thereby making the pipe loop 10 in the shape of a uniform cylinder.

Figure 6:
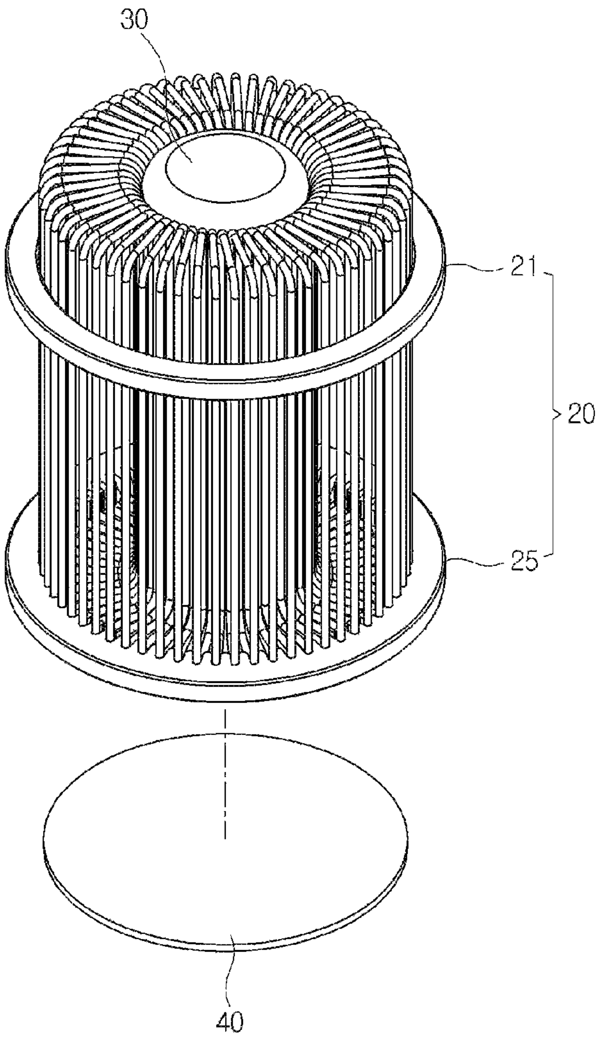

In the heat absorbing plate attaching step S140, a heat absorbing plate 40 is attached to at least one end section of the pipe loop 10 which is arranged in the cylindrical shape. For example, as shown in FIG. 6, the heat absorbing plate 40 may be attached to the end section side on which the spacing jig 25 is disposed. Accordingly, the pipe loop 10 can maintain the cylindrical shape even after the first arrangement jig 20 and the second arrangement jig 30 are removed from the pipe loop 10.

The method according to the present embodiment may further include the step of introducing a working fluid 13 into the pipe loop 10. Specifically, as shown in FIG. 7, the working fluid 13 is introduced into the pipe loop 10 so that bubbles 17 are mixed in the working fluid 13 at a predetermined ratio.

Then, the pipe loop 10 is sealed, thereby completing the heat pipe type heat-dissipating device. The pipe loop 10 may be sealed using a connection member 90 and an adhesive (not shown), as shown in FIG. 7. In this case, opposite open end sections of the pipe loop 10 which is filled with a mixture of the working fluid 13 and the bubbles 17 may be connected with each other using the connection member 90, to thereby form a closed loop. Alternatively, in order to connect the opposite end sections of the pipe loop 10, one end section thereof may be enlarged in diameter, and then the other end section may be inserted into the enlarged end section, without using the connection member 90. Further, the opposite end sections of the pipe loop 10 may be independently sealed, to thereby form an open loop.

In this respect, the process of introducing the working fluid 13 into the pipe loop 10 may be performed before or after the process of attaching the heat absorbing plate 40 to the pipe loop 10.

Figure 7:
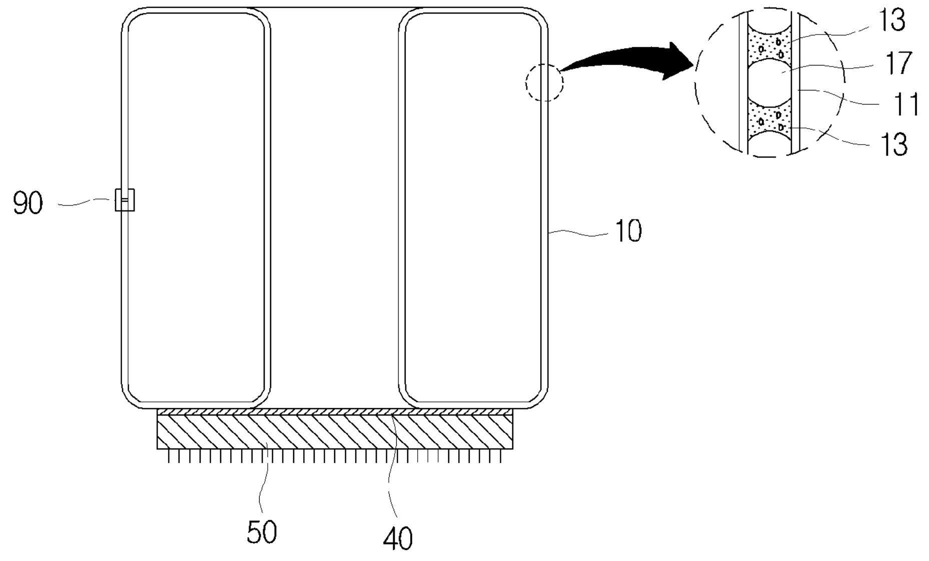

As shown in FIG. 7, the heat pipe type heat-dissipating device according to the present embodiment may be installed so that the heat absorbing plate 40 directly contacts a heat emitting source 50. For example, the heat emitting source 50 may include an electronic component such as a CPU, a chipset of a video card, a power transistor, an LED or the like.

In a case where the heat absorbing plate 40 and the heat emitting source 50 are installed on a bottom surface of the cylindrical pipe loop 10, the bottom surface of the pipe loop 10 serves as a heat absorbing section, and the remaining section thereof serves as a heat dissipating section. With such a configuration, heat generated in the heat emitting source 50 is absorbed into the heat absorbing section through the heat absorbing plate 40, and then is dissipated to the outside through the heat dissipating section.

Such a heat pipe type heat-dissipating device has a heat transfer mechanism which transfers a large amount of heat in the form of latent heat by means of expansion and contraction of the volumes of the working fluid 13 and the bubbles 17, which is well known in the art.

In the above-described embodiment, the pipe loop 10 is arranged in the radial shape and then the circular heat absorbing plate 40 is attached thereto, but the present invention is not limited thereto. For example, the pipe loop 10 may have a variety of arrangements and the heat absorbing plate 40 may also have a variety of shapes, according to the shape of the heat emitting source 50.

Figure 8:
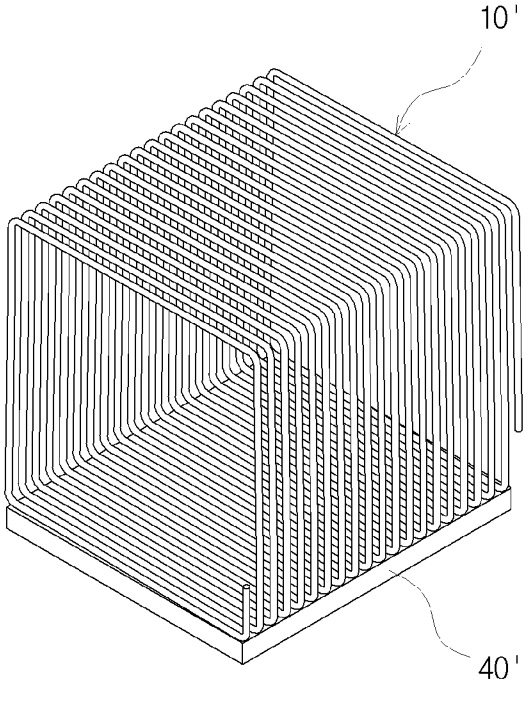
FIGS. 8 and 9 are diagrams illustrating a manufacturing method of a heat pipe type heat-dissipating device according to another exemplary embodiment of the present invention.
Figure 9:
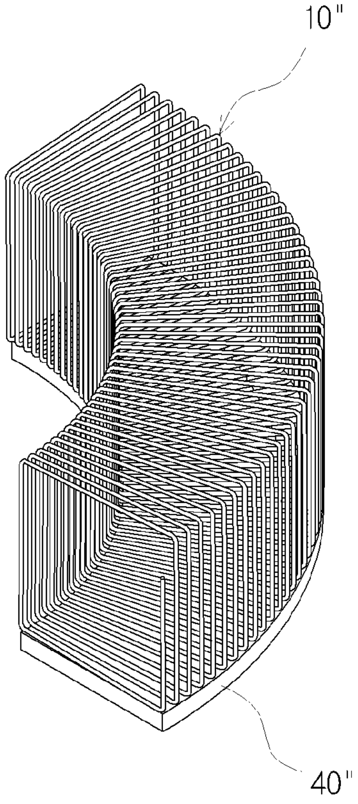

FIGS. 8 and 9 illustrate exemplary arrangements of a heat pipe type heat-dissipating device according to another embodiment of the present invention.

As shown in FIGS. 8 and 9, for example, the pipe loop 10' (10") may have a rectangular or arc arrangement, and the heat absorbing plate 40' (40") may have a corresponding shape.

It should be understood by those skilled in the art that various modifications, combinations, sub-combinations and alterations may occur depending on design requirements and other factors insofar as they are within the scope of the appended claims or the equivalents thereof.

What is claimed is:

1. A manufacturing method of a heat pipe type heat-dissipating device, comprising the steps of:

winding a pipe on a loop forming mold in a spiral shape to form a pipe loop; and pressing at least a section of an outer circumference of the pipe loop so that the pipe loop is plastically deformed in a shape corresponding to a shape of the loop forming mold, wherein an outer circumference of the loop forming mold has a polygonal shape, and wherein the pressing step comprises a step of pressing side regions between corner regions of the pipe loop so that an inner circumference of the pipe loop is plastically deformed into a shape corresponding to edges of the loop forming mold.

2. The method according to claim 1, further comprising a step of attaching a heat absorbing plate to the pipe loop after the pressing step.

3. The method according to claim 2, further comprising a step of arranging the pipe loop inside a first arrangement jig having an inner circumference in a radial shape to form the pipe loop in a cylindrical shape, wherein the heat absorbing plate attaching step comprises a step of attaching the heat absorbing plate to at least one end section of the pipe loop which is formed in the cylindrical shape.

4. The method according to claim 3, wherein the first arrangement jig comprises at least one of a supporting jig which supports an outer circumference of the pipe loop arranged in the radial shape and a spacing jig which maintains respective pipe windings of the pipe loop arranged in the radial shape at a predetermined interval.

5. The method according to claim 3, wherein the cylindrical pipe loop forming step comprises a step of supporting the inner circumference of the pipe loop arranged in the radial shape, using a second arrangement jig of a pillar shape.

6. The method according to claim 2, wherein the heat absorbing plate attaching step comprises a step of attaching the heat absorbing plate to at least one surface of the pipe loop.

7. The method according to claim 2, further comprising steps of:

introducing a working fluid into the pipe loop; and sealing the pipe loop.

8. The method according to claim 2, wherein the pipe loop comprises metal selected from the group consisting of copper, aluminum and iron.

9. The method according to claim 1, wherein the loop forming mold comprises a press groove which has a shape corresponding to a shape of a press member used for pressing the pipe loop in the pressing step and is extended adjacent to the edges of the loop forming mold.

10. The method according to claim 1, further comprising steps of:

introducing a working fluid into the pipe loop; and sealing the pipe loop.

11. The method according to claim 10, wherein the sealing step comprises a step of forming a single closed loop by connecting opposite open end sections of the pipe loop.

12. The method according to claim 1, wherein the pipe loop comprises metal selected from the group consisting of copper, aluminum and iron.

* * * * *